United States Patent

[11] 3,631,510

[72] Inventor Richard E. Monnier
Los Altos, Calif.

[21] Appl. No. 41,273
[22] Filed May 28, 1970
[45] Patented Dec. 28, 1971
[73] Assignee Hewlett-Packard Company
Palo Alto, Calif.

[54] RECORDER FOR PRINTING DOT ARRAYS ON ELECTROSENSITIVE PAPER
8 Claims, 4 Drawing Figs.

[52] U.S. Cl. .......... 346/74 E, 340/174 KC, 346/74 ES
[51] Int. Cl. .......... G01d 15/06
[50] Field of Search .......... 340/174 TB, 174 KC, 174 NC; 346/74 E, 74 ES, 74 S, 74 SB, 74 SC, 74 R

[56] References Cited
UNITED STATES PATENTS
3,380,069 4/1968 Hojo et al. .......... 346/74 ES

*Primary Examiner*—Bernard Konick
*Assistant Examiner*—Gary M. Hoffman
*Attorney*—Roland I. Griffin

ABSTRACT: A paper printer employing a plurality of groups of print fingers arranged linearly across the paper, each group of fingers printing the rows of dots in a different character across the paper is disclosed. A plurality of voltage step-up transformers are used to energize the fingers, each transformer including a primary winding and a plurality of secondary windings. One primary winding is provided for each finger of a group, and different ones of the secondary windings of each transformer are coupled to one of the fingers in each group of fingers. Circuit means are provided for enabling all the secondary windings associated with a selected group of fingers and additional circuit means are provided for energizing one or more of the primary windings associated with the desired finger or fingers in the group. Those enabled secondary windings associated with the primary winding or windings selectively energized develop currents to be passed through the desired finger or fingers in the group to mark the paper.

INVENTOR
RICHARD E. MONNIER

PATENTED DEC 28 1971 3,631,510

SHEET 2 OF 2

INVENTOR
RICHARD E. MONNIER

RECORDER FOR PRINTING DOT ARRAYS ON ELECTROSENSITIVE PAPER

BACKGROUND OF THE INVENTION

One form of high-speed electronic printer in common use today utilizes electrosensitive paper which is driven rapidly past a row of electrically conductive fingers extending in linear fashion across the paper. By momentarily energizing one or more of the fingers, an electrical current is passed through the paper under the tip of each particular energized finger and a visible dot is permanently printed on the paper at such points.

Characters such as alphabet letters and numbers may therefore be printed across the paper in arrays of such dots. For example, each character may be composed from a 5×7 array of dots, there being seven rows with five dots in each row. The contacting fingers are arranged in a plurality of groups along the row, each group comprising five fingers to mark the five dots in each character row. Since the characters are spaced apart by a fixed distance, for example two dot spaces, where continuous, unbroken plotting is desired, two additional fingers are included in each group and are positioned in the space between each five finger group.

One or more of the fingers in the first group of fingers are energized simultaneously to produce the required number of dots, i.e., one of five, for the first row of the first character, each group of fingers along the row being energized in sequence until all the dots in the first row of the individual characters have been formed. In other instances, two or more groups of fingers may be energized simultaneously. The speed of the paper relative to the speed of printing across the paper is selected so that the paper moves one row spacing during the time a complete row is printed. The second row of dots in each character is then made, one character at a time, across the paper, followed in sequence by the third and subsequent rows.

In one known form of printer device, a separate flip-flop and a separate energizing circuit have been employed in the circuit of each finger, the flip-flop serving as a switch to close the energizing circuit to the associated finger. Since the electrical potential needed to imprint the mark on the paper is relatively high, on the order of 60 to 80 volts, the energizing circuit must be capable of switching these high voltages, and thus fairly costly energizing circuits may be required. The number of flip-flops and energizing circuits needed is determined by the number of characters to be written across the paper; for example, in one system employing 8.5-inch wide paper and 560 print fingers arranged linearly across the paper, 560 individual flip-flops and energizing circuits are employed.

SUMMARY OF THE INVENTION

The object of the present invention is to provide a high-speed printer of the electrosensitive paper, conducting finger type, which avoids the use of expensive switches, such as flip-flop circuits, in the finger selection and energization system.

In the present invention, a plurality of pulse transformers and associated transistor switches are utilized to provide finger selection and energization, each transformer comprising a primary winding an a plurality of secondary windings. There is one transformer for each finger in a character group; for example, with five dots to a character row and thus five associated fingers, there are five primary windings in the five separate transformers. For plotting, two additional fingers with two associated transformers per group are provided.

Different ones of the secondary windings of each transformer are coupled to one of the fingers in each group of fingers. For example, assuming that there are twenty characters to be printed across the paper, each transformer is supplied with twenty secondary windings, each being coupled to an associated finger in a different one of the twenty finger groups.

To energize one or more of the fingers in a particular character group, all of the secondary windings associated with the fingers in that particular group are enabled. The primary winding or windings associated with the particular one or ones of the secondary windings, which are coupled to the fingers to be rendered conductive, are then energized. The associated secondary windings are thereby energized to produce a paper-marking current through the associated finger or fingers. Thus from one to five dots in one row of one character are recorded on the paper.

The secondary windings in the second character group of windings are then enabled, the desired one or ones of the primary windings being selectively energized to produce current flow in the selected fingers and thereby produce the dots in said one row of the next character.

Each character group along the said one row is selectively energized in sequence the print the first dot row for all the characters along the row, followed by the character dots in the second row, then the third row, etc.

The energization of the primary windings and the enabling of the secondary windings is accomplished with transistor switches which are operated near ground at standard low voltage logic levels, for example 5 volts, as distinguished from the case where flip-flops are used as switches and logic must operate near the print finger power supply level. In addition, the power supply for the transformer circuits is similar to that used for standard logic circuitry, i.e., an output of approximately 20 volts, the transformers being step-up transformers to increase the voltage on the finger circuit to the necessary high voltage, e.g., 60 volts.

By simple circuit arrangement, the finger current may be provided from the secondary winding during the time the primary winding is energized, or immediately after the period of energization of the primary winding.

DESCRIPTION OF THE PREFERRED EMBODIMENTS

Figure 1:
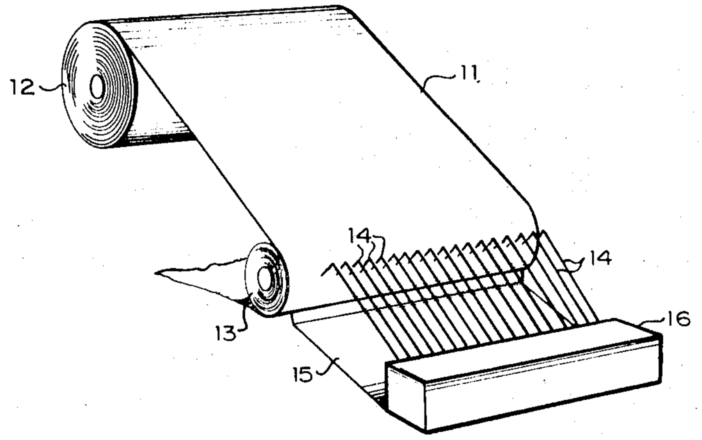
FIG. 1 is a schematic diagram of the paper transport and marking finger arrangement utilized in the recorder of the present invention.

Referring now to FIG. 1 the printer utilizes an electrosensitive paper 11 which is driven from a supply roll 12 and over a support roller 13 by any suitable drive mechanism. The paper may, for example, have a first coating of black epoxy, then a layer of a good electrically conducting material such as aluminum, and a top coating of a resistive material such as zinc oxide. The ends of the plurality of aligned contact fingers 14 press firmly against the paper where it passes over the roller 13 and a single, large contact finger 15 engages the paper a short distance from fingers 14. The fingers 14 and 15 extend from a support means 16, the finger 15 serving as a ground for the energizing circuits of fingers 14. A current passing through any one or more of the fingers 14 will pass through the zinc oxide and the aluminum to the ground finger 15. Where a momentary pulse of current passes under the tip of the finger 14, the zinc oxide and aluminum will be disintegrated, and the black epoxy underneath will be exposed to give a clearly visible dot.

Figure 2:
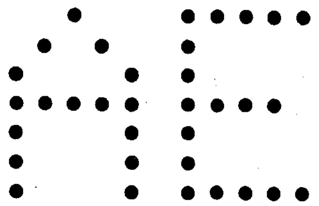
FIG. 2 is an illustration of two characters printed in a 5×7 dot array.

FIG. 2 illustrates two characters, A and E, made by the appropriate dots in a 5×7 array, the arrays being spaced apart two dot spaces.

Figure 3:
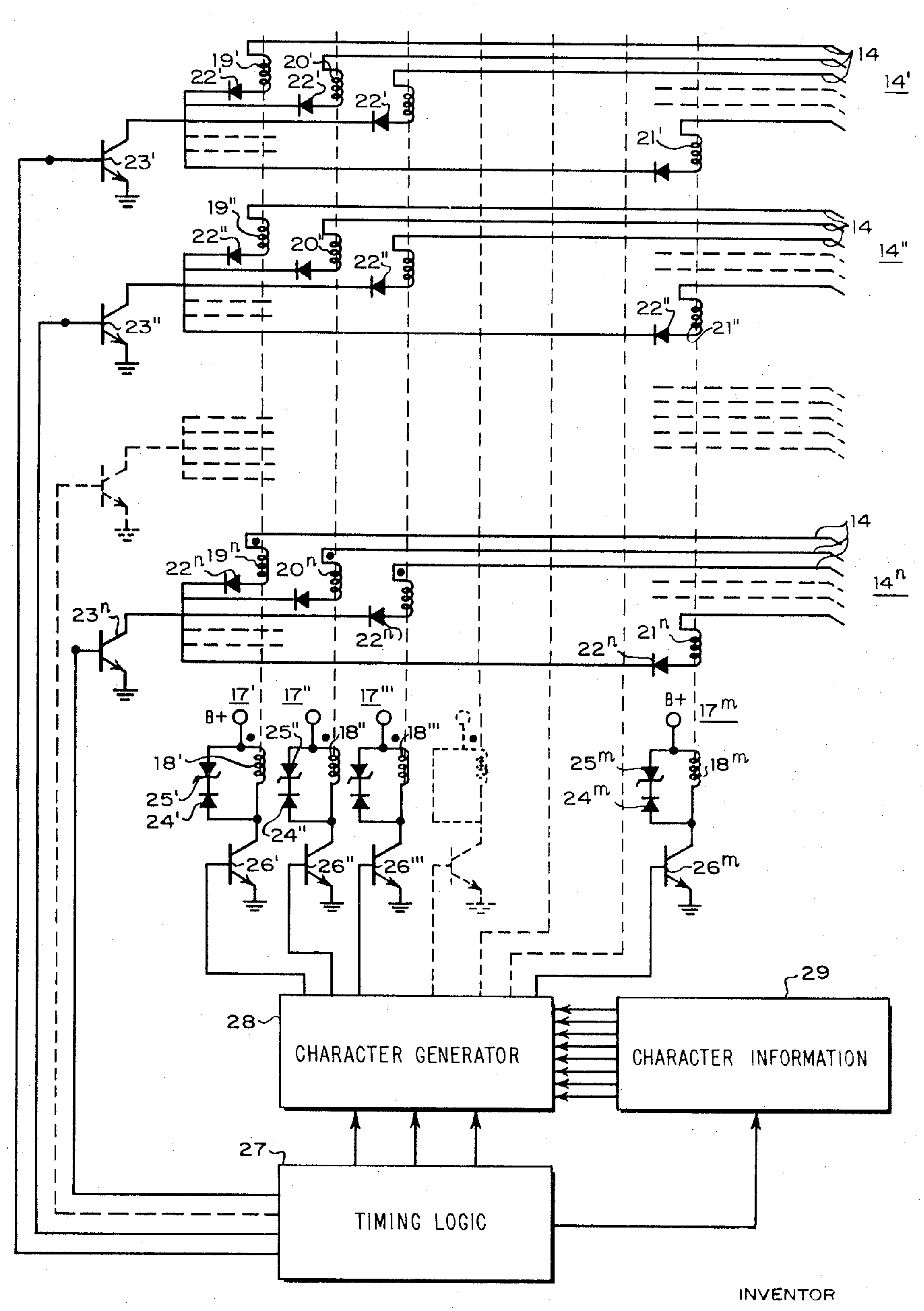
FIG. 3 is a schematic diagram of the selection circuit employed to energize the marking fingers.

The circuit utilized to provide the marking current to the fingers 14 is shown in FIG. 3. The fingers 14 are arranged in a plurality of groups 14', 14'',..., 14ⁿ across the paper from left to right as viewed in FIG. 1, each group comprising the number of fingers necessary to make the dots in a character row. For a character array with five dots per row, each group will have five fingers; where fill-in between the characters is desired, two additional fingers are included in the group. There is one finger group for each character to be printed across the paper; in this example we will assume there are 20 groups ($n$=20).

A plurality of transformers 17′, 17″,..., $17^m$ are provided, each including a primary winding 18′, 18″,..., $18^m$respectively, and a plurality of secondary windings 19′, 19″,..., $19^n$; 20′, 20″,..., $20^n$;...; 21′, 21″,..., $21^n$; respectively. There are as many transformers as there are fingers in a group, e.g., five or seven in our example, and there is a particular secondary winding of each transformer associated with one finger in each of the different groups of fingers.

Each of the secondary windings 19′, 20′,..., 21′ associated with the first finger group 14′ are coupled through diodes 22′ and in common to the collector of a clamp transistor 23′ associated with the finger group 14′. The secondary windings associated with the other finger groups 14″,..., $14^n$ are likewise coupled through diodes 22″,..., $22^n$ to the collectors of clamp transistors 23″,..., $23^n$ associated with the finger groups 14″,..., $14^n$, respectively.

Each of the primary windings 18′, 18″,..., $18^m$ has an associated diode 24′, 24″,..., $24^m$ and Zener diode 25′, 25″,..., $25^m$, respectively, coupled across it, one side of the primary windings being connected to the B+ supply, for example 24 volts, and the other side of the primary windings being connected to the collector of drive transistors 26′, 26″,..., $26^m$, respectively.

In operation, the finger groups 14′, 14″,..., $14^n$ are enabled in sequence by turning on the associated clamp transistors 23′, 23″,..., $23^n$ in sequence from the timing logic circuit 27. These clamps are turned on by the application to their bases of standard logic low level signals. The timing logic circuit also provides a 3 bit code to the character generator circuit 28 to cause the character generator to turn on the proper one or ones of the driver transistors at their bases with low voltage level inputs and thereby energize the primary windings of the transformers containing the particular one or ones of the secondary windings associated with the fingers to be energized in an enabled group of fingers. Energization of one or more of the primary windings will produce current flow in the associated one or ones of the secondary windings in the enabled finger group to cause current to flow through the associated finger or fingers in the group to print the dot or dots in the particular character being printed at that particular column in the row. The character information is provided to the character generator 28 in ASCII code in well known manner from the character information circuit 29 which is synchronized with the finger group selection from the timing logic circuit 27.

For example, assume the character A, then E, followed by eighteen other characters are to be printed across the paper. To print the single dot in the top row of the A character, finger group 14′ is enabled by turning on clamp 23′ to enable all of the secondary winding-finger circuits in group 14′. The character generator 28 selects and turns on only the third driver 26‴, causing current to flow in primary winding 18′-and the associated secondary winding connected to the third finger in finger group 14′. The diodes 22′ provide isolation of the other finger circuits in the group. This results in current flowing through the third finger of finger group 14′ to print the center dot in the top row of the A. The actual operation of the transformer circuit printing current is described in detail below.

The clamp 23′ is then turned off and the second group of fingers 14″ enabled by turning on clamp transistor 23″ from the timing logic circuit. The character generator 28 functions to turn on all the drivers 26′ to $26^m$ (where $m$=5) or the five drivers needed to print the five dots in the upper row of the E (if extra drivers and fingers are provided for plotting purposes). This results in current flowing through the five associated fingers in the finger group 14″ to print the five dots in the top row of the E character.

The top row dots in each successive character are printed in order across the paper, after which the second row of character dots are started for the A, then the E, and sequentially across the paper for the additional characters. The speed of the paper drive is selected to move the paper one dot row spacing between successive row printings. To print the second row of dots in the character A, clamp transistor 23′ is turned on to enable all the finger circuits in group 14′, and the second and fourth driver transistors 26″ and 26⁗, respectively, are turned on to energize the second and fourth primary windings and produce current flow in the two associated secondary windings and the second and fourth fingers in group 14′. Thereafter, the single dot in the second row of the E is made by turning on clamp 23″ and driver 26′ to energize the first finger in finger group 14″.

Figure 4:
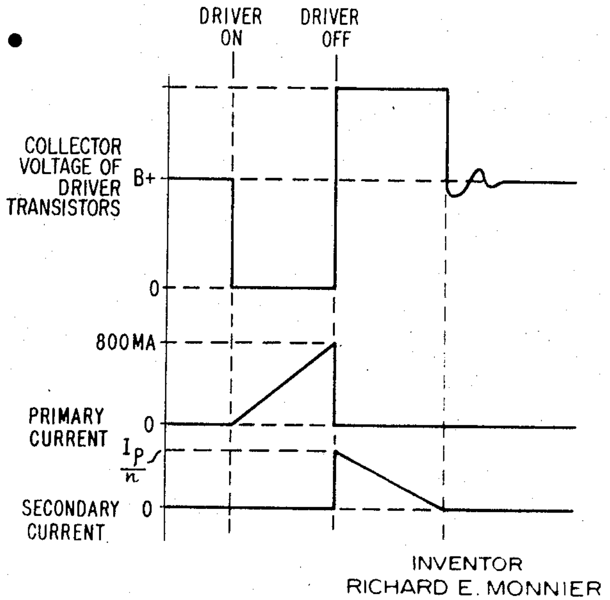
FIG. 4 shows traces illustrating the voltage across the primary winding and the current in the primary winding and a secondary winding during a finger pulsing stage.

The transformer circuits may be arranged to operate as current source or voltage source circuits; the current source mode is shown in FIG. 3. Referring to FIG. 4, when one or more of the driver transistors 26′, 26″, etc. is turned on, the voltage across the associated primary winding 18′, 18″, etc., becomes B+ volts and a linearly increasing current flows in the primary winding until such time as the driver is turned off, at which time the primary current has reached a suitable peak current, for example, 800 ma. The diodes 24′, 24″, prevent current flow in the Zener diodes 25′, 25″, etc. when transistors 26′, 26″, etc., are turned on. During this "driver on" period, current is prevented from flowing in the associated secondary winding in the enabled finger group circuits by the diodes 22′, 22″, etc. When the driver or drivers are turned off, the voltage across the associated primary windings immediately reverses to a value near 20 volts. Current now flows in the associated secondary winding until the energy stored in the transformer has been discharged. A suitable turns ratio of the transformer windings, for example 3 to 1, provides a secondary voltage near 60 volts from the standard logic circuit power level of 20–24 volts and a secondary current of Ip/3. This secondary current passes into the aluminum coating of the paper 11 under the finger and through to the ground finger 15. The current in the spot under the finger causes the aluminum to sputter away and leave a spot of the black epoxy exposed as a visible dot.

To have the transformer circuits operate as voltage sources, the polarity of the transformer primary or secondary windings are reversed, and the current flows in the secondary winding at the same time it is flowing in the associated primary winding during the "driver on" period. Since the current source mode of operation employs less energy to make the desired dot in the paper, it is preferred.

To improve the visibility of the dot, several pulses of finger current have been employed for each dot, and this has been accomplished by pulsing the selected drivers 26′, 26″, etc., on several times during the period the desired finger group is enabled.

The Zener diodes 25′, 25″, etc. are provided in the primary winding circuit to prevent the voltage across the primary from rising above about +30 volts should the finger coupled to the associated secondary winding not be touching the paper, preventing current from flowing in the secondary to discharge the stored energy in the transformer.

It should be understood that the row dots of more than one character may be printed at one time and that more than the 20 characters used to illustrate this invention may be printed across a row.

I claim:

1. A paper printer for producing marks upon electrosensitive paper by passing current through the paper, said printer comprising a plurality of electrically conducting fingers for contacting the paper, said fingers being arranged in a plurality of groups of fingers, a plurality of transformers, each comprising a primary winding and a plurality of associated secondary windings electromagnetically coupled to said primary winding, means for coupling each of said fingers in one of said groups of fingers to an associated one of the secondary windings in different ones of the transformers, each group of fingers being coupled to different ones of the secondary windings of said transformers, first circuit means coupled to said secondary windings for enabling the secondary windings associated with a selected one of said groups of fingers, and second circuit means coupled to said primary windings for energizing a selected one or more of said primary windings, whereby the enabled secondary windings associated with said selected one or more of said primary windings are energized, the fingers associated with the energized secondary windings being rendered electrically conducting to mark the paper.

2. A paper printer as in claim 1 wherein said secondary windings are connected to pass current through their associated fingers during the period their associated primary windings are energized.

3. A paper printer as in claim 1 wherein said secondary windings are connected to pass current through their associated fingers during the period immediately after their associated primary windings are energized.

4. A paper printer as in claim 1 wherein said first circuit means comprises a first plurality of transistor switches, each of said first plurality of transistor switches being coupled to the secondary windings associated with a different one of said groups of fingers and wherein said second circuit means comprises a second plurality of transistor switches, each of said second plurality of transistor switches being coupled to an associated different one of said primary windings.

5. A paper printer as in claim 4 wherein the transistor switches of said first and second circuit means each comprise a collector coupled to an associated one or more of said transformer windings and a base serving as a selective input.

6. A paper printer as in claim 5 including means for turning on said transistor switches with logic inputs applied to their bases.

7. A paper printer as in claim 5 wherein said first circuit means further comprises a first plurality of diodes, a separate one of which is connected in series with each of said secondary windings, and wherein said second circuit means further comprises a second plurality of diodes, one of which is connected across each of said primary windings.

8. A paper printer as in claim 7 wherein said second plurality of diodes includes a separate Zener diode coupled in series with another diode across each of said primary windings.

* * * * *

UNITED STATES PATENT OFFICE
CERTIFICATE OF CORRECTION

Patent No. 3,631,510 Dated December 28, 1971

Inventor(s) Richard E. Monnier

It is certified that error appears in the above-identified patent and that said Letters Patent are hereby corrected as shown below:

Column 1, line 28, "one of five" should read -- one to five --;

Column 1, line 61, "an" should read -- and --;

Column 2, line 14, "the" (first occurrence) should read -- to --;

Column 3, line 58, "18'-" should read -- 18''' --;

Column 3, line 64, after "transformer circuit", insert -- to produce the --.

Signed and sealed this 13th day of June 1972.

(SEAL)
Attest:

EDWARD M.FLETCHER,JR.
Attesting Officer

ROBERT GOTTSCHALK
Commissioner of Patents

FORM PO-1050 (10-69)
0-160010

USCOMM-DC 60376-P69
☆ U.S. GOVERNMENT PRINTING OFFICE : 1969 O—366-334